United States Patent Office 3,446,577
Patented May 27, 1969

3,446,577
PROCESS FOR PRODUCING HETEROPOLY METAL ACIDS
Vincent Chiola and Clarence D. Vanderpool, Towanda, Pa., assignors to Sylvania Electric Products Inc., a corporation of Delaware
No Drawing. Filed Dec. 22, 1966, Ser. No. 603,792
Int. Cl. C22b 59/00
U.S. Cl. 23—23     13 Claims

ABSTRACT OF THE DISCLOSURE

A process for preparing substantially alkali free heteropoly acids of tungsten and molybdenum wherein the heteroatom is arsenic, boron or phosphorus, is disclosed. The process comprises contacting in an aqueous solution at a temperature of from about 20 degrees to about 100 degrees C. (a) a tungstic or molybdic acid having the solubility characteristics approximating those of metatungstic acid and metamolybdic acids respectively with (b) at least one acid of the group consisting of acids of arsenic, boron and phosphorus. The tungstic or molybdic acid reactants can be prepared separately or are preferably formed in situ from a substantially alkali free hydrolyzable tungsten or molybdenum compound.

---

This invention relates broadly to the art of producing heteropoly "metal" (including metalloid) acids, and more particularly is concerned with a method of producing certain of such metal acids, specifically heteropoly tungstic and molybdic acids, that are substantially alkali free.

A typical example of heteropoly metal acids that can be produced in accordance with the method of this invention is 12-tungstophosphoric acid ($H_3PW_{12}O_{40} \cdot xH_2O$), which is commonly called phosphotungstic acid or phospho-12-tungstic acid. Other examples are tungstoarsenic, tungstoboric, molybdoarsenic, molybdoboric and molybdophosphoric acids. Such acids also may be named, respectively, as arsenotungstic, borotungstic, arsenomolybdic, boromolybdic and phosphomolybdic acids.

For ease in reading, the invention hereafter will be described for the most part with particular reference to the preparation of hereopolytungstic acids, although it is to be understood that the description is equally applicable to the preparation of heteropolymolybdic acids unless it is clear from the context that a different meaning is intended.

The classical method of making what is generally known as "alkali-free" 12-tungstophosphoric acid is by ether extraction of an acidified mixture of sodium tungstate and sodium hydrogen phosphate. The tungstophosphoric acid-ether complex may be decomposed by evaporation to crystallize the heteropoly acid [H. S. Booth, Ed., Inorganic Synthesis, vol. I, pp. 132–133 (1939), McGraw-Hill Book Company, New York, N.Y.]. Or, the ether-addition complex may be decomposed by heating with water or dilute hydrochloric acid solution, and the tungstophosphoric acid then crystallized from the water phase [ibid., vol. I, p. 133; D. H. Brown, J. Chem. Soc., pp. 3189–3193 (August 1962); and A. Riad Tourkey et al., J. Applied Chem. (London), 2, 202–4 (1952): C.A. 46, p. 9003 (1952)]. Bechtold (U.S. Patent No. 2,503,991) describes a method for removing alkali metal by contacting a dilute aqueous heteropoly acid with various cationic-exchange resins.

To the best of our knowledge and belief, all of the prior-art methods of making "alkali-free" heteropoly metal acids have the fundamental disadvantage of starting with an alkali tungstate as the soluable source of tungsten. (Commercially, heteropoly metal acids of the kind exemplified by tungstophosphoric acid are designated as "alkali free" when they contain less than 0.05% by weight of metallic alkali, and usually contain much less, e.g., 0.01% and less. The terms "alkali free" and "substantially alkali free" as used in this specification and in the appended claims have this same meaning.) Since the most generally available from of soluble tungstate is an alkali tungstate (or ammoniacal tungstate), the removal of alkali cation is mandatory in order to obtain high purity heteropoly acids such as 12-tungstophosphoric acid having less than 0.05% alkali-metal content by weight.

The present invention is based on our discovery of means whereby one can prepare, for example, 12-tungstophosphoric acid by starting with a hydrolyzable, alkali-free source of tungsten, more particularly a tungsten compound that is also cold-water-insoluble, e.g., a tungsten hexahalide such as the hexachloride and hexabromide. The reaction involves hydrolysis of the tungsten hexahalide in an aqueous "solution" (including dispersion or slurry) of, for instance, phosphoric acid when P is the element desired to be introduced into the heteropoly acid. A possible course of the reaction is postulated in the following equation wherein the tungsten hexahalide is illustrated as the hexachloride, $WCl_6$:

I 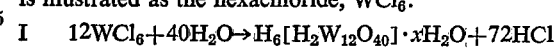

II 

The synthesis of 12-tungstophosphoric acid in accordance with the present invention is based upon the use as a starting reactant in solution (specifically in an aqueous solution), or the formation in situ in such a solution of soluble metatungstic acid, $H_6[H_2W_{12}O_{40}] \cdot xH_2O$, which is believed to be structurally similar to the heteropoly acids. Theoretically, such acids are derivable by replacing the hydrogens of the central portion of the heteropoly, specifically metatungstic, structure with various metal or metalloid atoms. Considerable evidence exists for the presence of metatungstic acid in aqueous solution. [D. L. Kepert, "Isopolytungstates," Prog. Inorg. Chem. 4, 199 (1962); H. Reny, Treatise on Inorganic Chemistry, vol. 2, p. 177, Elsevier Publishing Company, New York, N.Y. (1956).]

For economical and processing reasons, it is preferred to form and use the metatungstic acid in situ in a solvent (specifically water) rather than to employ preformed (separately prepared) metatungstic acid in solution or other available state. Hence, in accordance with the preferred embodiment of this invention, this is done by hydrolyzing a hydrolyzable, alkali-free tungsten or molybdenum compound (more particularly those wherein the W or Mo component of the compound has a valence of at least 4) in an aqueous solution (or dispersion or slurry) of phosphoric, arsenic or boric acids, or mixtures thereof in any proportions, depending upon the particular heteropoly tungstic or heteropoly molybdic acid that is to be prepared. Preferably the hydrolyzable, alkali-free tungsten or molybdenum compound is one wherein the W or Mo atom therein has a valence of at least 5, e.g., tungsten hexachloride or molybdenum pentachloride.

Taking a tungsen hexahalide, specifically tungsten hexachloride, as illustrative of the hydrolyzable tungsten (or molybdenum) compound that can be used as a starting reactant in practicing this invention, we have surprisingly and unobviously found that such a hydrolyzable compound can be concurrently hydrolyzed and converted to 12-tungstophosphoric acid by bringing the hydrolyzable hexavalent compound of tungsten (more particularly tungsten hexahalide) into contact with an aqueous solution, especially a dilute aqueous solution, of phosphoric acid. The heteropolyacid is obtained in a high degree of purity, and in yields approaching the theoretical (i.e., above 90%) except, in most cases, for normal mechanical losses due to filtering, transporting and the like.

Now taking 12-tungstophosphoric acid as illustrative of the heteropoly acids that can be produced in accordance with the present invention, and $WCl_6$ as illustrative of the hydrolyzable hexavalent tungsten compound, the following is a general description of the method.

An aqueous solution of phosphoric acid is prepared by adding the desired amount of phosphoric acid to an excess of water over the stoichiometrical amount required for the complete hydrolysis of the $WCl_6$ to metatungstic acid, i.e., an acid having the solubility and other characteristics approximating those of metatungstic acid. Thus, for the completion of the hydrolysis there is used substantially in excess of 3.33 moles of water for each mole of $WCl_6$, more particularly from 5 to 25, and preferably from 11 to 22 moles of water for each mole of $WCl_6$. Advantageously the amount of water is chosen so that the concentration of solids in the reaction mass is within the range of from about 10% to about 50% so that insoluble impurities therein are easily removed, e.g., by filtration, and the product is readily isolated from the filtrate, e.g., by evaporation to cause precipitation (crystallization) of the tungstophosphoric acid. Preferably distilled or deionized water is employed in order to minimize contamination of the product.

The amount of phosphoric acid that is used is generally such as to provide at least 0.5, more particularly from 0.5 (or from about 1.0) to about 1.5–2.0, gram atom of P for 12 gram atoms of W in the intermediate or final tungsten-containing product.

After adding the tungsten hexachloride to the aqueous solution of phosphoric acid at a suitable temperature, usually ambient temperature (20°–30° C.), the mixture is stirred at the same temperature, with or without heating above ambient temperature (for instance up to and at the reflux temperature of the reaction mass at atmospheric pressure), until hydrolysis of the tungsten hexachloride has been substantially completed. Evidence of the completion or approaching completion of the hydrolysis and the concurrent formation of the tungstophosphoric acid is generally indicated by a change in the visual appearance of the reaction mass, such as the development of a cloudiness or haze therein, and/or by the development of a color such as a greenish-white or a yellowish-white suspension.

As indicated in the foregoing paragraph, the reaction may be effected at temperatures ranging from about 20° C. to about 100° C. at atmospheric pressure. The reaction or digestion may be initiated at ambient temperature, continued at such temperature for a part of the total reaction period, and then heated to an elevated temperature for the remainder of the period of reaction. Alternatively, the reaction may be started cold and the reaction mass then heated gradually or intermittently to the maximum temperature of reaction. From the peak digestion temperature, the reaction mass may be slowly or rapidly cooled to ambient temperature; or, it may be allowed to "age" for a prolonged period of time, e.g., from 6 hours to a week or more, at ambient temperature before isolation of the product. Generally the reaction mass is filtered to remove impurities before such an aging process.

The reaction is ordinarily effected while the mixture is being agitated, e.g., with a stirring or other mechanical agitating mean, by using a tumbling reactor, or by other conventional means.

The normal length of the reaction or digestion period (exclusive of any subsequent aging period) will vary widely depending upon such influencing factors as, for example, the particular reactants employed, the temperature of reaction, the size of the batch, the type of digestion and agitating means employed, and the like. Usually the reaction is complete within a period of from about 3 to about 72 hours, more particularly from about 4 to about 24 hours. Any impurities are removed by suitable means, e.g., by filtration, centrifuging, etc. The product is then isolated from the filtrate by any appropriate means, e.g., by evaporation of the excess water to precipitate the product from solution, which is then filtered off and dried. If further purification is desired, the product may be recrystallized one or more times from pure water or other solvent for 12-tungstophosphoric acid.

The method of this invention may be carried out continuously, semi-continuously, or by batch operation, and at atmospheric or reduced pressures.

It is not essential that one use solid (e.g., finely divided or powdered) tungsten hexachloride as the starting reactant material. For example, in lieu of the solid form of tungsten hexachloride one may pass vapors of $WCl_6$ (B.P. 346.7° C.) into a sealed vessel containing the aqueous solution of phosphoric acid or other acid of a metal to be introduced into the molecule.

Instead of $WCl_6$ in solid or vaporous state, one may use solid or vaporous hydrolyzable compounds of tungsten or molybdenum that are free from alkali metal, e.g. $WBr_5$, $WBr_6$, $MoCl_5$, $MoBr_5$, $WOCl_4$, $WO_2Cl_2$, $MoOCl_4$, $MoO_2Cl_2$, $MoO_2Br_2$, the various tetralkoxy tungstates and molybdates (especially those having not more than five carbon atoms in the alkoxy grouping), e.g., tetraethoxy tungstate, $W(OC_2H_5)_4$, the "mixed" or unsymmetrical lower alkoxy-halogeno tetrasubstituted tungstates, e.g., diethoxydichloro tungstate, monoethoxytrichlorotungstates, monochlorotriethoxy tungstate, and the corresponding bromine-substituted tungstates. Unsymmetrical tetra-substituted molybdates containing hydrolyzable groups corresponding to the aforementioned hydrolyzable tungstates also may be employed. Other examples of tungsten and molybdenum compounds having hydrolyzable substituents will be apparent to those skilled in the art from the foregoing illustrative examples.

In a manner similar to that described above with reference to the preparation of 12-tungstophosphoric acid, other high-purity, alkali-free, heteropoly metal acids (especially heteropoly acids of tungsten and molybdenum) can be prepared. Numerous examples of such heteropoly acids have been given in the second paragraph of this specification.

The present invention is a solution to the problem of preparing certain heteropoly metal acids that are "alkali-free" (as that term previously has been defined) since it utilizes an alkali-free source of the metal, more particularly hydrolyzable, alkali-free compounds of tungsten and molybdenum as the starting material. Furthermore, and again taking by way of illustration $WCl_6$ as the hydrolyzable metal and tungstophosphoric acid as the heteropoly acid that is being prepared, hydrolysis of this hexachloride releases a large excess of HCl, specifically 77 moles of HCl per 12 moles of $WCl_6$. The advantage of this will be readily apparent to those skilled in the art especially when it is considered that, in all other methods, acid must be added to the reaction mass in order to reduce the pH to a point sufficiently low to allow the formation of the heteropoly acid.

In practicing the present invention, the heteropoly acid is recovered directly by crystallization after removal of insoluble matter from the reaction mass and evaporation of the resulting solution. No further addition of acid is required. Product losses due to handling, etc., are minimized. Ether extraction is avoided thereby providing further advantages in handling.

In order that those skilled in the art may better understand how the present invention can be carried into effect, the following examples are given by way of illustration and not by way of limitation. All parts and percentages are by weight unless otherwise stated.

Example 1

One gram (1.0 g.) of phosphoric acid, 85%, reagent grade, was added to 400 ml. (22.2 moles) of deionized water. This amount of phosphoric acid is equivalent to about 0.0087 mole $H_3PO_4$. To this was added 47.59 g. (0.12 mole) of a solid tungsten hexahalide, specifically tungsten hexachloride, $WCl_6$, in powder form. The solution was digested cold (i.e., at about 25° C.) for from 6 to 7 hours, at the end of which period of time the suspension of hexachloride had changed to a greenish-white or yellowish-white indicating the hydrolysis of the tungsten hexachloride and the formation of tungstic acid.

After removal of the insoluble matter (hydrated tungstic oxide mostly) by filtration, the filtrate was evaporated on a steam bath to precipitate a crystalline product. After air-drying on a funnel, the product was readily soluble in warm water to give a clear acidic solution. The product was identified as 12-tungstophosphoric acid by comparing the X-ray diffraction pattern of the crystalline product with that of a known specimen of 12-tungstophosphoric acid obtained from sodium tungstate and sodium hydrogen phosphate by a conventional method involving ether extraction or cation exchange. The sodium content was less than 0.05% by weight as determined by spectographic analysis.

Example 2

This example is similar to that of Example 1 with the exception that a different ratio of tungsten hexachloride to phosphoric acid was employed.

Two (2) grams of phosphoric acid, 85% reagent grade, was mixed with 400 ml. of cold, deionized water. To this was added 47.59 g. of tungsten hexachloride. The mixture was agitated at room temperature (about 25° C.) for 7 hours before complete hydrolysis of the black hexachloride crystals was effected and a slight amount of a white haze was formed. The solution was heated to boiling whereupon it became somewhat clearer and turned blue.

After settling and cooling to room temperature, the insoluble matter was removed by filtration. The filtrate was evaporated on a steam bath to give 27 g. of clear, glassy crystals which were identified as a 12-tungstophosphoric acid by the same technique described in Example 1. Analysis by flame photometry showed the sodium content to be 0.0043%. The crystals dissolved in warm water to give a clear, acidic solution.

Example 3

To an aqueous solution containing 1 g. 85% $H_3PO_4$ in 200 ml. deionized $H_2O$, there was slowly added 32.5 g. molybdenum pentachloride ($MoCl_5$). Agitation was continued throughout the addition period of ½ to 1 hour. The solution was agitated and heated at 95°–100° C. for 1 hour. Water was added to maintain the original volume. After 1 hour, 2 cc. of reagent strength nitric acid was added to oxidize reduced molybdenum. The color of the solution changed from deep blue to light green. The solution was then evaporated at 70°–80° C. to volatilize excess HCl. The solution's color changed to yellow during evaporation and concentration. When the concentrate was at the viscous, syrupy stage, cooling resulted in a crystalline, yellow product. The crystals were dried at 70° C. and identified by X-ray diffraction as 12-molybdophosphoric acid.

Example 4

This example illustrates the preparation of a substantially alkali-free tungstoarsenic acid.

Two and three-tenths grams (2.3 g.) of arsenic trioxide was slurried in 100 ml. of water. To this was added 47.3 g. of tungsten hexachloride to form a slurry of the admixture of reactants. The slurry was digested and the solvent (water) was evaporated under reduced pressure at 20°–30° C. The resulting solid product was reslurried in 100 ml. deionized water and again digested while evaporation of solvent proceeded at room temperature.

The solid product resulting from the foregoing procedure was dissolved in water at 80° C., and filtered to remove insoluble hydrated tungstic oxide. Tungstoarsenic acid was recovered from the filtrate by evaporation at 80° C. Its X-ray diffraction pattern was typical of a heteropoly acid such as phosphotungstic acid.

Example 5

This example illustrates the preparation of a substantially alkali-free molybdoarsenic acid.

After slurrying 1.14 g. of arsenic pentoxide in 100 ml. of water, there was slowly added to the resulting slurry 32.5 g. of $MoCl_5$. This yielded a deep blue solution, which was heated to 80° C. To the hot solution was added 5 ml. of hydrogen peroxide to eliminate the blue color. A clear, yellow solution resulted. Heating was continued, accompained by evaporation of the aqueous solvent, until the material dried to yield a product that was grayish yellow in color. Water was added to the dried material to redissolve the soluble portion of the mixture of molybdoarsenic acid and $MoO_3$. The insoluble hydrated molybdic oxide was filtered off. The resulting clear, yellow filtrate was evaporated to yield green, solid molybdoarsenic acid which was completely soluble in warm water. The results of analysis are given below:

Theoretical for $H_3[AsMo_{12}O_{40}] \cdot 10\ H_2O$: Mo, 56.19%; As, 3.65%. Found, Mo, 55.83%; As, 4.85%.

Example 6

This example illustrates the preparation of tungstoboric acid.

In a procedure similar to that employed in Example 1, 2.46 g. of boric acid was slurried with 47.5 g. of powdered $WCl_6$ in 400 ml. of deionized water. The resulting slurry was agitated for 3 hours at 25° C., and then the temperature of the slurry was increased to 95° C. over a period of 1 hour. The filtrate that was obtained after filtering off insoluble hydrated tungstic oxide was yellow in color. The product had the acidic, water-soluble characteristics of tungstoboric acid. The yield was low, more particularly about 5%.

Example 7

This example illustrates the preparation of molybdophosphoric acid from metamolybic acid (also known as polymolybdic acid and as isopolymolybdic acid).

Metamolybdic acid was made by passing a solution of sodium molybdate through a column of cation-exchange resin, more particularly a sulfonated styrene-divinylbenzene copolymer having about 8% cross-linkage and which is commercially available under the name of Illco 211.

Nineteen (19) grams of metamolybdic acid obtained in the above-described manner was slurried in 100 ml. of deionized water, and 1 gram of reagent-grade, 85% $H_3PO_4$ was added thereto. The mixture was digested at 90°–100° C. until all of the metamolybdic acid had dissolved. The solution was filtered to remove insoluble material. The resulting clear filtrate was evaporated to crystallize a yellow product. This product was identified as 12-molybdophosphoric acid by X-ray diffraction examination in comparison with known 12-molybdophosphoric acid.

Instead of the particular cation-exchange resin used in this example, one may use any other cation-exchange reagent of organic or inorganic, and of natural or synthetic origin. Illustrative examples of such reagents are given in U.S. Patent No. 2,503,991, column 2, lines 4–34, and in the patents sited therein.

From the foregoing description, including the numbered illustrative examples, it will be seen that the present invention provides a relatively simple and economical method of preparing substantially alkali-free heteropoly acids of tungsten and molybdenum wherein the hetero atom is arsenic, boron or phosphorus. These heteropoly acids are produced by contacting in aqueous solution and at a temperature of from about 20° C. to about 100° C. (a) a tungstic or molybdic acid having the solubility characteristics approximating those of metatungstic and metamolybdic acids, respectively, with (b) at least one acid of the group consisting of acids of arsenic, boron and phosphorus. The tungstic or molybdic acid reactant may be separately prepared (see, for instance, Example 7) but is preferably formed in situ from a substantially alkali-free, hydrolyzable tungsten or molybdenum compound of which numerous examples have been given in the foregoing specification. In the latter case, the hydrolysis is accompanied by the concurrent formation of the corresponding heteropoly tungstic or molybdic acid wherein the hetero atom is arsenic, boron or phosphorus.

Particularly useful alkali-free, hydrolyzable compounds of tungsten and molybdenum for the purpose of this invention are the chlorides, bromides, oxychlorides and oxybromides of tungsten and molybdenum that have a valency of at least 5, and of which numerous examples have been given hereinbefore.

What is claimed as new is:

1. The method of preparing substantially alkali free heteropoly acids of tungsten and molybdenum wherein the heteroatom is arsenic, boron or phosphorus, which comprises contacting in a substantially alkali free aqueous solution and at a temperature within the range of from about 20° C. to about 100° C.
  (a) a tungstic or molybdic acid having the solubility characteristics approximating those of metatungstic and metamolybdic acids, respectively, with
  (b) at least one acid of the group consisting of acids of arsenic, boron and phosphorus,
the amount of the acid of (b) in the said aqueous solution being sufficient to provide at least 0.5 gram atom of the aforesaid heteroatom for each 12 gram atoms of W or Mo in the tungstic or molybdic acid of (a), and isolating said substantially alkali free heteropoly acid.

2. The method as in claim 1 wherein the acid of (a) is formed in situ, and which includes the additional step of isolating from the reaction mass the heteropoly acid of tungsten or molybdenum that is formed.

3. The method as in claim 2 wherein the acid of (a) is formed in situ by the hydrolysis of (A) a hydrolyzable, alkali-free tungsten or molybdenum compound in which the W or Mo has a valency of at least 5 while the said compound is admixed with (B) at least one acid of the group consisting of acids of arsenic, boron and phosphorus, said hydrolysis being accompanied by the concurrent formation of the corresponding heterpoly tungstic or molybdic acid wherein the hetero atom is at least one member of the group consisting of arsenic, boron and phosphorus; and the amount of the acid of (B) being sufficient to provide from 0.5 to about 2.0 gram atoms of the aforesaid hetero atom for each 12 gram atoms of W or Mo in the heteropoly tungstic or molybdic acids obtained as a product of the method.

4. The method as in claim 3 wherein the hydrolyzable, alkali-free compound of (A) is a chloride, bromide, oxychloride or oxybromide of tungsten or molybdenum having a valency of at least 5.

5. The method as in claim 3 wherein the hydrolyzable, alkali-free compound of (A) is tungsten hexachloride.

6. The method as in claim 3 wherein the hydrolyzable, alkali-free compound of (A) is molybdenum pentachloride.

7. The method as in claim 3 wherein the hydrolyzable, alkali-free compound of (A) is tungsten hexachloride and the acid of (B) is phosphoric acid.

8. The method as in claim 3 wherein the hydrolyzable, alkali-free compound of (A) is tungsten hexachloride and the acid of (B) is arsenic acid.

9. The method as in claim 3 wherein the hydrolyzable, alkali-free compound of (A) is tungsten hexachloride and the acid of (B) is boric acid.

10. The method as in claim 3 wherein the hydrolyzable, alkali-free compound of (A) is molybdenum pentachloride and the acid of (B) is phosphoric acid.

11. The method of preparing 12-tungstophosphoric acid which comprises:
  (A) forming an admixture of (a) finely divided tungsten hexachloride and (b) an aqueous solution of phosphoric acid,
    the amount of water in the said aqueous solution being substantially in excess of the stoichiometrical amount required for complete hydrolysis of the said tungsten hexachloride to metatungstic acid, and
    the amount of phosphoric acid in the said aqueous solution being sufficient to provide from 0.5 to about 2.0 gram atoms of P for each 12 gram atoms of W in the final product;
  (B) maintaining the admixture of A at a temperature of from about 20° C. to about 100° C. at atmospheric pressure for a period sufficient to hydrolyze the said tungsten hexachloride to metatungstic acid and concurrent conversion of the latter to 12-tungstophosphoric acid; and
  (C) isolating 12-tungstophosphoric acid from the resulting reaction mass.

12. The method as in claim 11 wherein the amount of water in the aqueous solution of phosphoric acid corresponds to from about 5 to about 25 moles of water for each mole of $WCl_6$.

13. The method as in claim 1 wherein the acid of (a) is metamolybdic acid and the acid of (b) is phosphoric acid.

References Cited
UNITED STATES PATENTS

| | | | |
|---|---|---|---|
| 2,503,991 | 4/1950 | Bechtold | 23—140 |
| 3,288,562 | 11/1966 | Laferty | 23—140 |
| 3,361,518 | 1/1968 | Chiola et al. | 23—23 |

HERBERT T. CARTER, *Primary Examiner.*

U.S. Cl. X.R.

23—140